United States Patent
Oh et al.

(10) Patent No.: US 6,738,644 B2
(45) Date of Patent: May 18, 2004

(54) APPARATUS AND METHOD FOR INCREASING DATA TRANSMISSION EFFICIENCY IN IMT-2000 BASE STATION CONTROLLER

(75) Inventors: Se-Jong Oh, Ichon-shi (KR); Mi-Sook Baek, Ichon-shi (KR)

(73) Assignee: Hyundai Electronics Co., Ltd., Kyoungki-do (KR)

( * ) Notice: Subject to any disclaimer, the term of this patent is extended or adjusted under 35 U.S.C. 154(b) by 487 days.

(21) Appl. No.: 09/801,539

(22) Filed: Mar. 8, 2001

(65) Prior Publication Data
US 2002/0002054 A1 Jan. 3, 2002

(30) Foreign Application Priority Data
Mar. 10, 2000 (KR) .......................... 2000-12132

(51) Int. Cl.$^7$ ................................. H04B 1/38
(52) U.S. Cl. ...................... 455/561; 455/515
(58) Field of Search ................. 455/560, 561, 455/562.1, 434, 515

(56) References Cited

U.S. PATENT DOCUMENTS 5,321,690 A * 6/1994 Sato ........................... 370/280
6,185,438 B1 * 2/2001 Fox ............................ 455/560

\* cited by examiner

Primary Examiner—Nick Corsaro
(74) Attorney, Agent, or Firm—Baker Botts LLP

(57) ABSTRACT

An apparatus for increasing data transmission efficiency in an international mobile telecommunication-2000 (IMT-2000) base station controller includes a) user message determining unit for receiving a user message from an exterior; determining whether the user message is control data or traffic data; and transmitting the control data or the traffic data; b) channel interface unit for receiving the control data or the traffic data from the user message determining unit and transmitting the control data or the traffic data; c) traffic data controlling unit for receiving the traffic data and information about quantity of data and transmitting the traffic data; d) storage unit for storing the control data or the traffic data; and e)storage managing unit for measuring quantity of data stored in the storage means and transmitting measured quantity information.

13 Claims, 2 Drawing Sheets

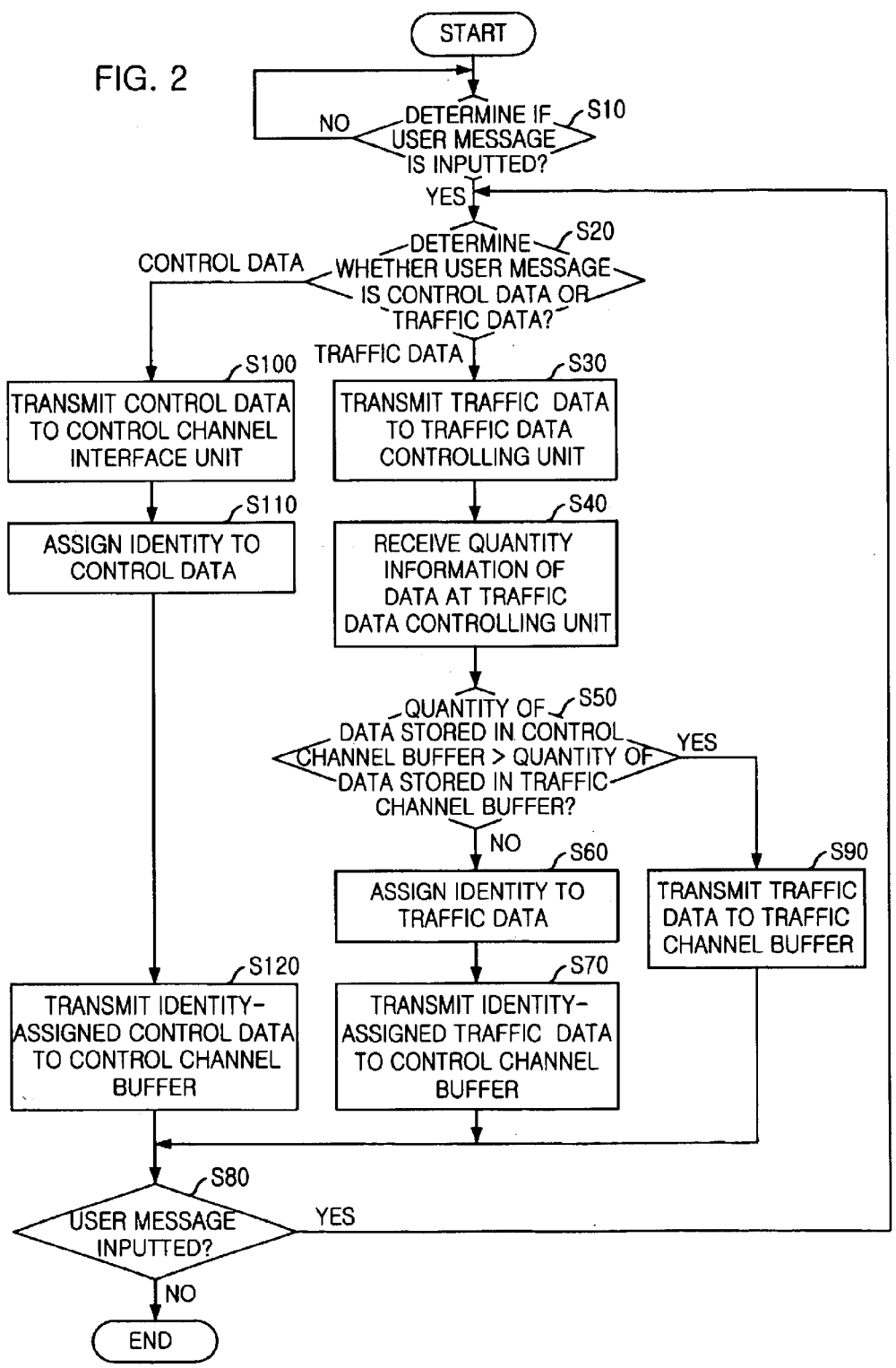

APPARATUS AND METHOD FOR INCREASING DATA TRANSMISSION EFFICIENCY IN IMT-2000 BASE STATION CONTROLLER

FIELD OF THE INVENTION

This invention relates to an apparatus and a method for increasing a data transmission efficiency in an international mobile telecommunication-2000 (IMT-2000) base station; and more particularly, to an apparatus and a method for enabling a dispersed transmission and a priority transmission to increase a data transmission efficiency in an international mobile telecommunication-2000 (IMT-2000) base station.

DESCRIPTION OF THE PRIOR ART

In case of a conventional multiplexer (MUX) equipped in an international mobile telecommunication-2000 (IMT-2000) base station, when a control message and traffic data are transmitted from a radio link control unit, a higher-leveled processor of the MUX, the MUX stores the inputted traffic data in a buffer for a traffic channel and performs a data transmission. On the other hand, the MUX stores the inputted control message in a buffer for a control channel and performs a data transmission.

However, because there is more quantity of the traffic data than that of the control message during a communication service, usable extra resources are wasted unused in the control channel and the buffer for the control channel. Also, because packet data of high speed is transmitted only through the traffic channel, many delays and loss of data are caused to thereby lower quality of a service.

SUMMARY OF THE INVENTION

It is an object of the present invention to provide an apparatus and method for increasing data transmission efficiency by providing dispersed transmission and priority transmission in an international mobile telecommunication-2000 (IMT-2000) base station controller.

In accordance with an aspect of the present invention, there is provided an apparatus for increasing data transmission efficiency in an international mobile telecommunication-2000 (IMT-2000) base station controller, including: user message determining means for receiving a user message from an exterior; determining whether the user message is control data or traffic data; and transmitting the control data or the traffic data; channel interface means for receiving the control data or the traffic data from the user message determining means and transmitting the control data or the traffic data; traffic data controlling means for receiving the traffic data and information about quantity of data and transmitting the traffic data; storage means for storing the control data or the traffic data; and storage managing means for measuring quantity of data stored in the storage means and transmitting measured quantity information.

Also, there is provided a method for increasing data transmission efficiency using an apparatus for increasing data transmission efficiency which includes user message determining means, channel interface means including control channel interface means and traffic channel interface means, traffic data controlling means, storage means including a first storage unit and a second storage unit, and storage managing means including a first storage managing unit and a second storage managing unit in an international mobile telecommunication-2000 (IMT-2000) base station controller, the method including the steps of: a) by the user message determining means, determining a data type of a user message inputted from an exterior; b) if the data type is traffic data, by the user message determining means, transmitting the traffic data to the traffic data controlling unit through the traffic channel interface means; c) by the traffic data controlling unit, receiving information about quantity of data that are stored in each of the first storage unit and the second storage unit from the first storage managing unit and the second storage managing unit, respectively; d) by the traffic data controlling unit, determining one of the first storage unit and the second storage unit; and e) by the traffic data controlling unit, transmitting the traffic data to the determined storage unit wherein the traffic data are stored.

BRIEF DESCRIPTION OF THE DRAWINGS

Other objects and aspects of the invention will become apparent from the following description of the embodiments with reference to the accompanying drawings, in which:

FIG. 2 is a flow chart illustrating a method for controlling the apparatus enabling a dispersed transmission and a priority transmission to increase data transmission efficiency in the IMT-2000 base station controller in accordance with the present invention.

DETAILED DESCRIPTION OF THE PREFERRED EMBODIMENTS

Figure 1:
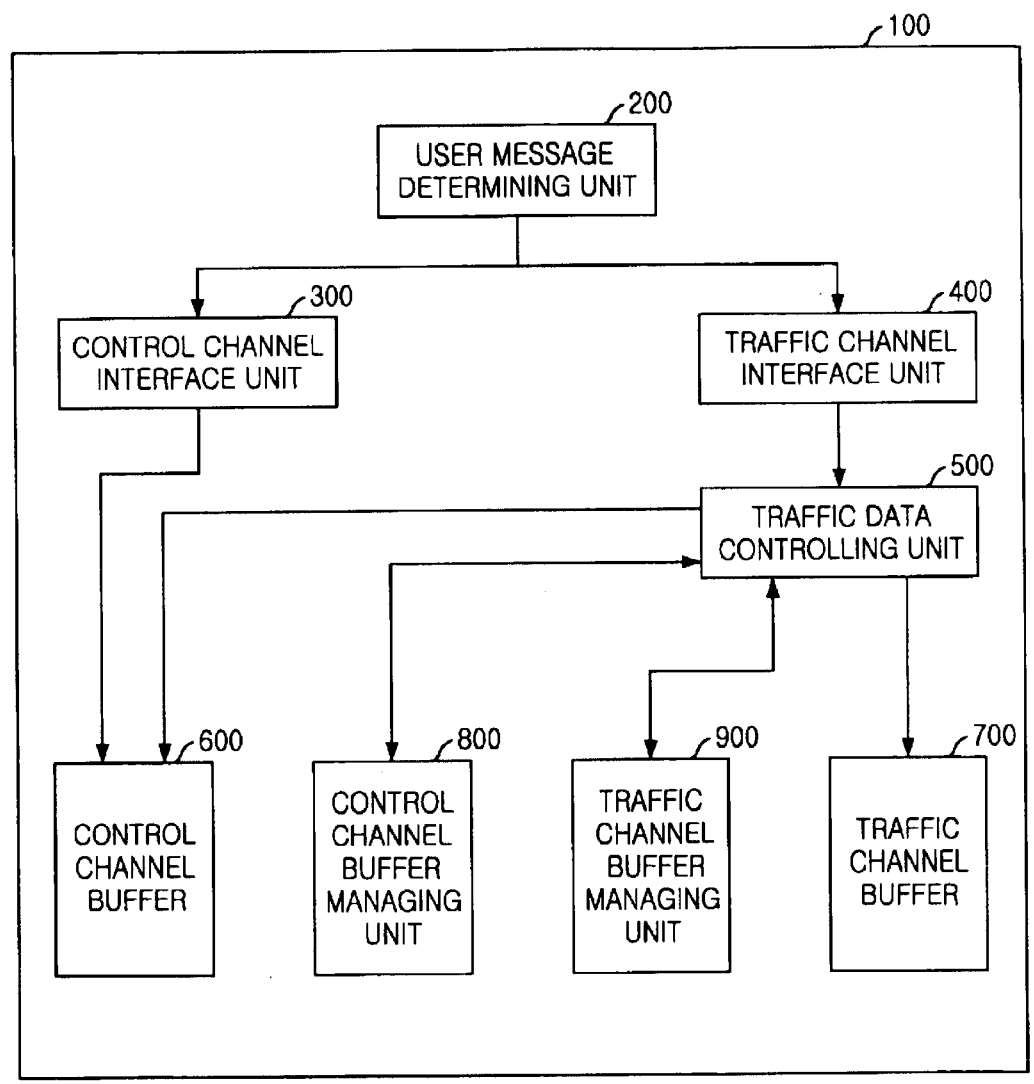
FIG. 1 is a block diagram illustrating an apparatus wherein a dispersed transmission and a priority transmission are possible in an international mobile telecommunication-2000 (IMT-2000) base station (BS) in accordance with the present invention.

FIG. 1 is a block diagram illustrating an apparatus enabling a dispersed transmission and a priority transmission to increase data transmission efficiency in an international mobile telecommunication-2000 (IMT-2000) base station controller (BSC) in accordance with the present invention.

The apparatus 100 includes a user message determining unit 200, a control channel interface unit 300, a traffic channel interface unit 400, a traffic data controlling unit 500, a control channel buffer 600, a traffic channel buffer 700, a control channel buffer managing unit 800 and a traffic channel buffer managing unit 900.

When a user message is inputted to the user message determining unit 200 from a radio link control unit that is a higher-leveled processor of the user message determining unit 200, the user message determining unit 200 determines whether the inputted user message is control data or traffic data, based on a channel identification (ID) information included in the user message. Then, the user message determining unit 200 transmits the user message to corresponding one of the control channel interface unit 300 or the traffic channel interface unit 400.

The control channel interface unit 300 receives the control data transmitted from the user message determining unit 200, transmits the control data to the control channel buffer 600 and the control data is stored in the control channel buffer 600.

The traffic channel interface unit 400 receives the traffic data transmitted from the user message determining unit 200 and transmits the traffic data to the traffic data controlling unit 500.

The control channel buffer 600 stores the control data and the traffic data that are received, respectively, from the control channel interface unit 300 and the traffic data controlling unit 500 and then are to be transmitted to a next system.

The traffic channel buffer 700 stores the traffic data that are received from the traffic data controlling unit 500 and then are to be transmitted to a next system.

The control channel buffer managing unit 800 is a processor that manages a state of the control channel buffer 600. The control channel buffer managing unit 800 measures quantity of data that are stored in the control channel buffer 600 and transmits measured quantity information to the traffic data controlling unit 500.

The traffic channel buffer managing unit 900 is a processor that manages a state of the traffic channel buffer 700. The traffic channel buffer managing unit 900 measures quantity of data that are stored in the traffic channel buffer 700 and transmits measured quantity information to the traffic data controlling unit 500.

The traffic data controlling unit 500 receives the measured quantity information of the data that are stored in each of the buffers 600 and 700, from the control channel buffer managing unit 800 and the traffic channel buffer managing unit 900, respectively. Then, the traffic data controlling unit 500 determines in which buffer less data are stored, the control channel buffer 600 or the traffic channel buffer 700 based on the received quantity information of the data. After the determination, the traffic data controlling unit 500 transmits to the determined buffer the traffic data that receives from the traffic channel interface unit 400.

FIG. 2 is a flow chart illustrating a method for controlling an apparatus enabling a dispersed transmission and a priority transmission to increase data transmission efficiency in the IMT-2000 base station controller in accordance with the present invention.

At the step S10, the user message determining unit 200 determines if the user message is inputted from the radio link control unit, and if not, the logic flow returns to the step S10, otherwise the logic flow proceeds to step S20.

At the step S20, the user message determining unit 200 determines whether the user message is control data or traffic data.

If the user message is the traffic data as a result of the determination at the step s20, the user message determining unit 200 transmits the traffic data to the traffic data controlling unit 500 through the traffic channel interface unit 400 at the step S30.

At the step S40, the traffic data controlling unit 500 receives data quantity information about the data that are stored in each of the control channel buffer 600 and the traffic channel buffer 700, from the control channel buffer managing unit 800 and the traffic channel buffer unit 900, respectively.

At the step S50, the traffic data controlling unit 500 determines if the control channel buffer 600 stores more data therein than the traffic channel buffer 700 by comparing the received the two data quantity information, and if not, the logic flow proceeds to step S60, otherwise proceeds to step S80.

At the step S60, the traffic data controlling unit 500 assigns an identity (ID) that is used for discriminating the control data and the traffic data.

At the step S70, the traffic data controlling unit 500 transmits the ID-assigned traffic data to the control channel buffer 600. Then, the ID-assigned traffic data is stored in the control channel buffer 600, located behind other traffic data that is stored last in the control channel buffer.

At the step S80, it is determined if the user message is inputted, and if inputted, the logic flow returns to the step S20.

At the step S90, the traffic data controlling unit 500 transmits the traffic data to the traffic channel buffer 700, and the traffic data is stored therein.

If the user message is the control data as a result of the determination of the step s20, the user message determining unit 200 transmits the control data to the control channel interface unit 300 at the step S100.

At the step S110, when the control channel interface unit 300 receives the control data from the user message determining unit 200, the control channel interface unit 300 assigns to the control data an identity (ID) that is used for discriminating the control data and the traffic data.

At the step S120, the control channel interface unit 300 transmits the ID-assigned control data to the control channel buffer 600. Then, the ID-assigned control data is stored in the control channel buffer 600, located behind other control data that is stored last in the control channel buffer.

In storing a plurality of control data and traffic data in the control channel buffer 600, the control data should be always located before a region where the traffic data are stored in the control channel buffer 600. The reason is that the control data have a transmission priority over the traffic data at a transmission time to the control channel.

As can be seen from described above, in case the control data and the traffic data from a high-leveled processor need to be transmitted to a next system, the traffic data can be transmitted dispersedly through one of the traffic channel and the control channel a traffic of which is less busy, so that transmission speed of the traffic data can be increased and also, a traffic service of high quality can be provided to a user.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. An apparatus for increasing data transmission efficiency in an international mobile telecommunication-2000 (IMT-2000) base station controller, comprising:
   user message determining means for receiving a user message from an exterior, determining whether the user message is control data or traffic data and transmitting the control data or the traffic data;
   channel interface means for receiving the control data or the traffic data from the user message determining means and transmitting the control data or the traffic data;
   traffic data controlling means for receiving the traffic data and information about quantity of data and transmitting the traffic data;
   storage means for storing the control data or the traffic data; and
   storage managing means for measuring quantity of data stored in the storage means and transmitting measured quantity information.

2. The apparatus as recited in claim 1, wherein the channel interface means includes:

control channel interface means for receiving the control data from the user message determining means and transmitting the control data; and traffic channel interface means for receiving the traffic data from the user message determining means and transmitting the traffic data to the traffic data controlling means.

3. The apparatus as recited in claim 1, wherein the storage means includes:

first storage unit for storing the control data and the traffic data; and second storage unit for storing the traffic data.

4. The apparatus as recited in claim 1, wherein the storage managing means includes:

first storage managing unit for measuring quantity of data stored in the first storage unit and transmitting first measurement information to the traffic data controlling means; and second storage managing unit for measuring quantity of data stored in the second storage unit and transmitting second measurement information to the traffic data controlling means.

5. The apparatus as recited in claim 1, wherein determining whether the user message is the control data or the traffic data is performed based on channel identity information that is included in the user message.

6. The apparatus as recited in claim 4, wherein the traffic data controlling means includes:

determining means for determining in which less quantity of the data is stored, the first storage unit or the second storage unit.

7. The apparatus as recited in claim 6, wherein the traffic data controlling means performs determining by comparing the first measurement information from the first storage managing unit and the second measurement information from the second storage managing unit.

8. The apparatus as recited in claim 3, wherein the traffic data from the traffic data controlling means are transmitted to one of the first storage unit and the second storage unit where less traffic data are stored.

9. A method for increasing data transmission efficiency using an apparatus which includes user message determining means, channel interface means including control channel interface means and traffic channel interface means, traffic data controlling means, storage means including a first storage unit and a second storage unit, and storage managing means including a first storage managing unit and a second storage managing unit in an international mobile telecommunication-2000 (IMT-2000) base station controller, the method comprising the steps of:

a) by the user message determining means, determining a data type of a user message inputted from an exterior;

b) if the data type is traffic data, by the user message determining means, transmitting the traffic data to the traffic data controlling means through the traffic channel interface means;

c) by the traffic data controlling means, receiving information about quantity of data that are stored in each of the first storage unit and the second storage unit from the first storage managing unit and the second storage managing unit, respectively;

d) by the traffic data controlling means, determining one of the first storage unit and the second storage unit; and e) by the traffic data controlling means, transmitting the traffic data to the determined storage unit.

10. The method as recited in claim 9, wherein the step b) further includes the steps of:

f) if the data type is control data, by the user message determining means, transmitting the control data to the control channel interface means;

g) by the control channel interface means, assigning an identity (ID) to the control data wherein the identity (ID) is used for distinguishing the control data from the traffic data; and h) by the control channel interface means, transmitting the ID-assigned control data to the first storage unit.

11. The method as recited in claim 10, wherein the step d) includes the steps of:

d1) by the traffic data controlling means, comparing quantity of data stored in the first storage unit with quantity of data stored in the second storage unit based on the information about quantity of data; and d2) by the traffic data controlling means, selecting one of the first storage unit and the second storage unit wherein the quantity of the stored data is less.

12. The method as recited in claim 11, wherein the step e) includes the steps of:

e1) if the determined storage unit is the first storage unit, by the traffic data controlling means, assigning an ID to the traffic data that is used for distinguishing the traffic data from the control data;

e2) transmitting the ID-assigned traffic data to the first storage unit; and e3) if the determined storage unit is the second storage unit, by the traffic data controlling means, transmitting the traffic data to the second storage unit.

13. The method as recited in claim 12, wherein ID-assigned traffic data that is stored earliest of all ID-assigned traffic data in the first storage unit should be located behind ID-assigned control data that is stored last of all ID-assigned control data in the first storage unit.

* * * * *